(12) United States Patent
Lei (10) Patent No.: US 11,858,184 B2
(45) Date of Patent: Jan. 2, 2024

(54) METHOD FOR PRODUCING FLOORBOARD FOR QUICK SIDESLIP INSTALLATION (71) Applicant: ANHUI YANGZI FLOORING INCORPORATED COMPANY, Chuzhou (CN)

(72) Inventor: Xiang Lei, Chuzhou (CN)

(73) Assignee: ANHUI YANGZI FLOORING INCORPORATED COMPANY, Chuzhou (CN)

( * ) Notice: Subject to any disclaimer, the term of this patent is extended or adjusted under 35 U.S.C. 154(b) by 139 days.

(21) Appl. No.: 17/595,980

(22) PCT Filed: Sep. 18, 2019

(86) PCT No.: PCT/CN2019/106375
§ 371 (c)(1),
(2) Date: Dec. 1, 2021

(87) PCT Pub. No.: WO2020/244093
PCT Pub. Date: Dec. 10, 2020

(65) Prior Publication Data
US 2022/0219359 A1 Jul. 14, 2022

(30) Foreign Application Priority Data
Jun. 4, 2019 (CN) .......................... 201910482763.7

(51) Int. Cl.
B29C 45/14 (2006.01)
B29B 13/10 (2006.01)
(Continued)

(52) U.S. Cl.
CPC .......... *B29C 45/1418* (2013.01); *B29B 13/10* (2013.01); *B29C 45/0053* (2013.01);
(Continued)

(58) Field of Classification Search
None
See application file for complete search history.

(56) References Cited

FOREIGN PATENT DOCUMENTS

| CN | 101407069 A | 4/2009 |
|----|-------------|--------|
| CN | 102152366 A | 8/2011 |

(Continued)

OTHER PUBLICATIONS

LY/T 2058-2012, Blanks for soild wood flooring, 2012, pp. 1-9.

*Primary Examiner* — Kelly M Gambetta
*Assistant Examiner* — Virak Nguon
(74) *Attorney, Agent, or Firm* — Bayramoglu Law Offices LLC (57) ABSTRACT A production method of a floor for quick side-slide installation includes the following steps: step 1: sorting of floor blanks; step 2: curing of the floor blanks; step 3: sanding of the floor blanks; step 4: cutting-to-thickness of the floor blanks; step 5: surface treatment of the floor blanks; step 6: cutting-to-length and molding of the floor blanks; step 7: spraying of anti-cracking oil on the floor blanks; step 8: plastic encapsulation of the floor blanks; step 9: application of a paint to back surfaces of the floor blanks; and step 10: application of the paint or vegetable oil to the floor blanks. A locking frame is hidden under bosses of a floor blank after being injection-molded, which achieves high locking accuracy and firm assembly.

20 Claims, 4 Drawing Sheets (51) Int. Cl.
    *B29C 45/00*     (2006.01)
    *B29C 45/26*     (2006.01)
    *B29C 45/27*     (2006.01)
    *B29C 45/73*     (2006.01)
    *B29C 45/77*     (2006.01)
    *B29C 45/78*     (2006.01)
    *E04F 15/04*     (2006.01)
    *B29C 45/17*     (2006.01)
    *B29L 31/00*     (2006.01)

(52) U.S. Cl.
    CPC .... *B29C 45/14819* (2013.01); *B29C 45/2602* (2013.01); *B29C 45/2737* (2013.01); *B29C 45/73* (2013.01); *B29C 45/77* (2013.01); *B29C 45/78* (2013.01); *E04F 15/04* (2013.01); *B29C 2045/0079* (2013.01); *B29C 2045/1784* (2013.01); *B29C 2945/76498* (2013.01); *B29C 2945/76531* (2013.01); *B29C 2945/76688* (2013.01); *B29L 2031/732* (2013.01)

(56) References Cited

FOREIGN PATENT DOCUMENTS

| | | | |
|---|---|---|---|
| CN | 104441183 | A * | 3/2015 |
| CN | 104441183 | A | 3/2015 |
| CN | 104563439 | A | 4/2015 |
| CN | 104441183 | B | 9/2016 |
| CN | 105922423 | A | 9/2016 |
| CN | 106272850 | A | 1/2017 |
| CN | 206551370 | U | 10/2017 |
| CN | 109016040 | A | 12/2018 |
| CN | 110067358 | A | 7/2019 |
| EP | 0727292 | A1 | 8/1996 |

\* cited by examiner

METHOD FOR PRODUCING FLOORBOARD FOR QUICK SIDESLIP INSTALLATION

CROSS REFERENCE TO THE RELATED APPLICATIONS

This application is the national phase entry of International Application No. PCT/CN2019/106375, filed on Sep. 18, 2019, which is based upon and claims priority to Chinese Patent Application No. 201910482763.7, filed on Jun. 4, 2019, the entire contents of which are incorporated herein by reference.

TECHNICAL FIELD

The present invention relates to the technical field of floors, and more particularly, to a production method of a floor for quick side-slide installation.

BACKGROUND

People demand beautiful and practical home decoration. As a must-have for home decoration, floors are at the forefront of the industry to bring comfort to people's lives. In recent years, various types of floors such as solid wood floors, log floors, composite floors, and multilayer floors have emerged one after another, greatly enriching the home decoration market.

Solid wood floors are fabricated by drying and processing the wood, and have the features of natural patterns, comfortable to the touch and safe to use. There are high-grade solid wood floors for decoration of bedrooms, living rooms and study rooms, etc. However, due to hygroexpansion of wood, traditional solid wood floors have high requirements for the use environment. They are prone to expand after being damped and contract after being heated, which results in damage to the floors, and poses great limitations for floor applications.

In order to enhance the market competitiveness of the floors and meet the high requirements of consumers for the floor's heat resistance, the floors are usually subjected to a series of treatments. For example, the solid wood blanks are subjected to high-temperature carbonization or secondary balance treatment, the tongues and grooves of the floorboards are coated with an edge-sealing paint, the bottom surfaces of the floorboards are coated with the paint or vegetable oil, and the tongues, the grooves and the bottom surfaces of the floorboards are covered with a film. Alternatively, the bottom surfaces of the floorboards are coated with paint or vegetable oil, the tongues and grooves of the floorboards are wax-sealed, and the bottom surfaces of the floorboards are covered with a film. These treatments block the wood surfaces from contacting water or high-humidity air, and reduce the adverse effects of environmental temperature and humidity changes on the wood, so as to achieve moisture prevention and retention. However, the treated floors still have some problems. The heat treatment changes the natural characteristics of the wood, resulting in weaker physical properties and darker color of the wood. In addition, although the secondary balance treatment protects the natural characteristics of the wood, there are still the following problems. First, the paint applied to the tongues and the grooves cannot completely cover the surface of the wood, but can only play a part of moisture prevention and retention. Second, when the tongues and the grooves are fitted after being wax-sealed, the wax film is prone to break and fall off due to movement and installation tapping, which will affect the decoration effect.

Chinese patent CN106272850A discloses a manufacturing process of a solid wood floor. In the manufacturing process, a plastic encapsulation frame surrounds a floorboard to achieve a desirable moisture-proof effect. However, the process adopts an exposed plastic lock, and the plastic lock is directly exposed at the periphery of the floorboard after being molded, which affects the appearance after laying.

Chinese patent CN104441183B discloses a production process of a wood floor with a hidden plastic frame. In the production process, the plastic frame is hidden under the floorboard. However, this patent does not disclose the treatment process of the floor blank, the injection molding process of the floor blank, the mold structure, the process parameters and the implementation method. The relevant parameters of the injection molding process are particularly critical for the accuracy of the floor locks that need to be assembled together for use. It is unclear how to achieve the accuracy.

SUMMARY

In order to overcome the shortcomings of the prior art, the present invention provides a production method of a floor for quick side-slide installation. A locking frame is hidden under bosses of a floor blank after being injection-molded, which achieves high locking accuracy and firm assembly.

To achieve the above objective, the present invention adopts the following technical solutions:

A production method of a floor for quick side-slide installation includes the following steps:

step 1: sorting of floor blanks:
  the floor blanks are inspected one by one in terms of moisture content, dimensions and appearance quality; the moisture content is controlled within 6-11%; the dimensions meet a production requirement; and the appearance quality meets a requirement of LY/T 2058-2012 Blanks for Solid Wood Flooring;

step 2: curing of the floor blanks:
  the floor blanks qualified after being sorted in step 1 are stacked in a curing area for curing for 25-30 days; the floor blanks are ventilated and protected from sun and rain; and the curing area has a relative humidity of 25-55% and a temperature of 20-25° C.;

step 3: sanding of the floor blanks:
  top surfaces of the floor blanks qualified after being cured in step 2 are sanded to be flat and smooth, without missing sanding;

step 4: cutting-to-thickness of the floor blanks:
  the floor blanks qualified after being sanded in step 3 are put on a conveyor belt, and respective back surfaces of the floor blanks faces up during feeding; a back-groove-free tool is used to cut the floor blanks to a thickness in accordance with the production requirement; and after cutting-to-thickness, the back surfaces of the floor blanks are flat and smooth without indentation;

step 5: surface treatment of the floor blanks:
  the top surfaces of the floor blanks are treated to be flat or non-flat; when the top surfaces of the floor blanks are required to be non-flat, the top surfaces of the floor blanks are hand-scraped or wire-brushed; and when the top surfaces of the floor blanks are required to be flat, the top surfaces of the floor blanks need no treatment;

step 6: cutting-to-length and molding of the floor blanks:

the floor blanks after being surface-treated in step 5 are placed on a four-sided planer; first, a double-end milling device is used to cut the floor blanks to a length in accordance with the production requirement; a pre-cutting knife, a molding knife, a finishing knife and a locking knife of the four-sided planer are activated in sequence to mill two layers of fixing grooves at a periphery of the floor blanks, where upper fixing grooves and lower fixing grooves are retracted from the top surfaces to the back surfaces of the floor blanks; a boss with an inclined side is formed between a top surface of each of the upper fixing grooves and a top surface of each of the floor blanks; and an acute angle is defined between the inclined side and the top surface of a first groove;

step 7: spraying of anti-cracking oil on the floor blanks:

the anti-cracking oil is evenly sprayed by a spray gun onto peripheral end surfaces of the floor blanks after being milled in step 6;

step 8: plastic encapsulation of the floor blanks:

the floor blanks after being sprayed with the anti-cracking oil in step 7 are placed in a lower molding cavity of a lower mold, where the top surfaces of the floor blanks face down; an upper mold is closed downward with the lower mold; then an injection head injects a molten material into locking cavities formed by the periphery of the floor blanks and an upper molding cavity of the upper mold and the lower molding cavity of the lower mold; after injection, water is immediately pumped to cool the lower molding cavity of the lower mold; an injection-molded frame and injection-molded locks formed on the injection-molded frame are formed at the periphery of the floor blanks; and the injection-molded frame is hidden under bosses of the floor blanks;

step 9: application of a paint to the back surfaces of the floor blanks:

the back surfaces of the floor blanks after being subjected to plastic-encapsulation in step 8 are sanded by a sander, and are applied with the paint;

step 10: application of the paint or vegetable oil to the floor blanks:

the floor blanks after being applied with the paint on the back surfaces in step 9 are sanded by the sander, and then are applied with the paint or the vegetable oil.

Preferably, in step 2, for each stack of floor blanks, five floor blanks may be arranged in three rows at an equal interval to serve as a stack base, and the other floor blanks may be stacked in layers; on each layer, three floor blanks may be stacked vertically and seven floor blanks may be stacked horizontally; and a distance between adjacent stacks of floor blanks may be at least 30-50 cm.

Preferably, in step 3, an 80, 100 or 120-grit sanding belt may be used for sanding.

Preferably, in step 6, when the floor blanks may be cut to a length, an edge breakage may be less than or equal to 4 mm.

Preferably, in step 8, the injection head may include standing posts, a fixing block, a hydraulic lifting rod, a heating sleeve, a hydraulic rotor, a feed port, a screw and a nozzle; the hydraulic rotor may be connected to a top of the screw, and the nozzle may be connected to a bottom of the screw; the feed port may be provided on the screw and adjacent to the hydraulic rotor; the fixing block may be fixedly sleeved outside the heating sleeve; the standing posts penetrate and may be slidably connected to four corners of the fixing block; bottoms of the standing posts may be slidably fixed in sliding grooves provided in a supporting frame of an injection molding machine; the supporting frame may be provided with a first through hole opposite to the nozzle; and the hydraulic lifting rod may be provided between the supporting frame of the injection molding machine and the fixing block.

Specifically, in step 8, the upper mold may include a fastening plate, a connecting port, straight flow channels, curved flow channels, a cooling plate and an upper molding plate, which are arranged in sequence from top to bottom and connected to the supporting frame of the injection molding machine; the upper molding cavity may be provided on the upper molding plate; the fastening plate may be provided with a second through hole opposite to the first through hole; a third through hole may be provided at a middle of the straight flow channels; a top of the connecting port may be connected to the second through hole, and a bottom of the connecting port may be connected to the third through hole; at least two straight material channels may be embedded in the straight flow channels, and inlets of all the straight material channels communicate with the third through hole; the number of the curved flow channels may be equal to the number of the straight material channels; fourth through holes may be respectively provided at middles of the curved flow channels; outlets of all the straight material channels respectively communicate with the fourth through holes; a plurality of curved material channels may be embedded in the curved flow channels, and inlets of all the curved material channels respectively communicate with the fourth through holes; the cooling plate may be embedded with locking pin tubes, where the number of the locking pin tubes is identical to the number of the curved material channels; outlets of the curved material channels respectively communicate with inlets of the locking pin tubes in one-to-one correspondence; the upper molding cavity may be internally provided with lock-shaped adhesive ports; and outlets of the locking pin tubes respectively communicate with the adhesive ports of the upper molding cavity.

Specifically, electric heating tubes for heat preservation of the molten material may be respectively provided outside the straight flow channels and the curved flow channels; and four straight flow channels may be arranged and distributed in an X shape.

Specifically, each of the locking pin tubes may be provided with a T-shaped cross section; the locking pin tubes may be hollow inside, and each of the locking pin tubes may be internally provided with a perforated metal filter; a diameter of the perforated metal filter and a diameter of each of the outlets of the locking pin tubes may be equal to be 1 mm; and each of the locking pin tubes may be externally provided with an electric heating tube for heat preservation of the molten material.

Specifically, four corners of the upper molding plate of the upper mold may be provided with upper circular mold positioning blocks; upper mold closing positioning blocks may be provided at a center of the upper molding plate in the upper molding cavity; and the upper molding plate may be provided with slider positioning blocks opposite to a long side and a wide side of the upper molding cavity respectively.

Specifically, in step 8, the lower mold may include a pallet supporting frame, a lower molding plate provided on the pallet supporting frame, the lower molding cavity provided on the lower molding plate and matched with the upper molding cavity, a long-side slider provided on the lower molding plate and corresponding to a long side of the lower molding cavity, a wide-side slider provided on the lower molding plate and corresponding to a wide side of the lower molding cavity, and pallet posts; bottoms of the pallet posts may be fixedly connected to the pallet supporting frame; the lower molding plate in the lower molding cavity may be provided with ejection holes matched with the pallet posts; tops of the pallet posts may be provided in the ejection holes, and the tops of the pallet posts may be movable upward along the ejection holes to stick out of the ejection holes; and pneumatic pushers may be respectively connected to the long-side slider and the wide-side slider.

Specifically, four corners of the lower molding plate of the lower mold may be provided with lower circular mold positioning blocks that may be respectively matched with the upper circular mold positioning blocks; and lower mold closing positioning blocks matched with the upper mold closing positioning blocks may be provided at a center of the lower molding plate.

Specifically, when the floor blanks may be subjected to plastic-encapsulation, the floor blanks may be placed in the lower molding cavity of the lower molding cavity, where the top surfaces of the floor blanks face down; the pneumatic pushers push the long-side slider and the wide-side slider to move inward respectively to clamp a to-be-injected floor blank, and then the lower mold and the upper mold may be closed; the hydraulic rotor starts to rotate and pressurize; the molten material passes through the nozzle via the straight flow channels, the curved flow channels and the locking pin tubes to the adhesive ports of the upper molding cavity, and then may be injected into the locking cavities at the periphery of the to-be-injected floor blank; cooling water of 20-25° C. may be pumped to cool the lower molding cavity of the lower mold for 20-30 s; after the treatment lasts for a total of 40-50 s, the upper mold may be moved upward to be separated from the lower mold; the long-side slider and the wide-side slider of the lower mold may be separated under the action of the pneumatic pushers; and the injected locking floor may be lifted by the pallet posts, and the locking floor may be separated from the molding cavity.

Specifically, there may be two lower molds, namely a lower left mold and a lower right mold; a floor blank may be placed in the lower molding cavity of the lower left mold; the to-be-injected floor blank may be clamped through the pneumatic pushers, and the supporting frame of the injection molding machine slides up to the upper mold along the sliding grooves, such that the lower left mold may be closed with the upper mold to complete injection; and after the lower left mold may be separated from the upper mold, the lower right mold may be subjected to the same operation to be closed with the upper mold to complete injection.

Specifically, in step 8, when the injection head injects the molten material into the locking cavities, a flow rate of solute in the molten material may be required to be greater than 22 g/10 min; after the molten material may be solidified, the flow rate of the solute may be tested to be greater than 16 g/10 min; and the molten material may be at 220-230° C.

Specifically, in step 8, the mold may be heated before the injection molding of the injection-molded locks of the floor blank; the cooling water in the upper molding plate may be connected, and the electric heating tubes outside the straight flow channels and the curved flow channels may be turned on; the temperature of the electric heating tubes and the temperature of the nozzle of the injection head may be set to 220-230° C.; and when the temperature of the electric heating tubes outside the straight flow channels and the curved flow channels rises to 160° C., electric heating tubes outside the locking pin tubes may be turned on and set to 220-230° C.

Specifically, in step 8, when the injection head injects the molten material into the locking cavities, 120-130 g of molten material may be injected into the injection-molded locks of a single injection-molded floor blank; when the molten material passes through the nozzle to the straight flow channels, the molten material may be injected at a pressure of 72-78 bar and a flow rate of 92-96% for a stroke of 58-65 mm; when the molten material passes through the straight flow channels to the curved flow channels, the molten material may be delivered at a pressure of 28-32 bar and a flow rate of 68-72% for a stroke of 38-42 mm; when the molten material passes through the curved flow channels to the locking pin tubes, the molten material may be delivered at a pressure of 15-21 bar and a flow rate of 48-52% for a stroke of 28-32 mm; and when the molten material passes through the locking pin tubes to the adhesive ports of the upper molding cavity, the molten material may be delivered at a pressure of 52-58 bar for 0.13-0.17 s and at a flow rate of 48-52%.

Specifically, in step 9, the paint may be applied to the back surfaces of the floor blanks as follows: the back surfaces of the floor blanks may be sanded, dust left on the back surfaces of the floor blanks due to sanding may be absorbed, and a layer of transparent putty may be coated evenly; the floor blanks may be subjected to ultraviolet (UV) semi-curing, sanded with sandpaper, and coated with a high-hardness primer and an ordinary primer in sequence; and the floor blanks may be subjected to UV semi-curing, sanded with 240-grit sandpaper, and coated with a colored putty and a transparent primer, where an amount of the paint applied may be above 100 g/m$^2$.

Specifically, the floor blanks include, but may be not limited to, pure solid wood floors, glued floors, fiber floors, shavings floors, artificial floors, parallel-to-grain wood laminate floors, joinery floors, finger-jointed floors, integrated floors, wood-plastic composite floors, magnesium oxide floors and bamboo parquet floor.

Specifically, the molten material may be composed of polyethylene, polypropylene, polyvinyl chloride, polystyrene, polyoxymethylene, polychromium carbonate, an acrylic plastic, polyolefin, a polyolefin copolymer, polysulfone, polyphenylene ether, a thermoplastic composed of chlorinated polyether, a hot melt adhesive, or a thermoplastic elastomer.

Compared with the prior art, the present invention has the following beneficial effects:

1. Two layers of fixing grooves are milled at the periphery of the floor blank, where upper fixing grooves and lower fixing grooves are retracted from the top surfaces to the back surfaces of the floor blanks. The locking frame is hidden under the bosses of the floor blank after being injection-molded, which achieves high locking accuracy and firm assembly. In addition, the bosses with an inclined side are formed between a top surface of each of the upper fixing grooves and the top surface of the floor blank. An acute angle is defined between the inclined side and the top surface of a first groove. During injection molding, the bosses at the periphery of the floor blank are respectively attached to the mold cavities. The ribs on the inclined sides of the bosses and the side walls of the mold cavities isolate the injection space from the top surface of the floor blank to prevent the rubber from overflowing to the top surface of the floor blank. Therefore, there will be no excess glue on the top surface of the floor blank, and no secondary treatment is required. The cost of secondary treatment of excess rubber is reduced, and the production efficiency is improved.

2. The locking pin tubes have a T-shaped design, and each are externally provided with a spiral electric heating sleeve for heat preservation of the molten material. The locking pin tubes are hollow inside and each are provided therein with a perforated metal filter. The perforated metal filter has a diameter of 1 mm, which is matched with the 1 mm outlet of the corresponding locking pin tube to prevent a pin gate from being blocked by foreign matter in the molten material. The outlet of the locking pin tube is connected to a corresponding adhesive port of the upper molding cavity. Under normal pressure, the molten material in the 1 mm pin gate will not flow out in a large amount, which plays a role of throttling. The locking pin tubes are embedded in a channel of the cooling plate, and cooling water is passed into the cooling plate to keep the temperature of the upper molding cavity not higher than 40° C., and to prevent any material change or size deviation of the molding cavity due to high temperature.

3. The injection head is provided with four heating sections arranged in sequence from top to bottom, namely, a first section, a second section, a third section and a fourth section (nozzle section). The first and second sections are melting sections, and the third and fourth sections are mixing and heat preservation sections, which ensure that the material is completely melted and ensure the flow rate of solute in the molten material.

4. The mold is heated before the injection. First, the cooling water in the upper and lower molding plates is connected, and the electric heating tubes outside the straight flow channels and the curved flow channels are turned on. The temperature of the electric heating tubes and the temperature of the nozzle of the injection head are set to 220-230° C. When the temperature of the electric heating tubes outside the straight flow channels and the curved flow channels rises to 160° C., the electric heating tubes outside the locking pint tubes are turned on and set to 220-230° C. This design prevents the molding cavity temperature from being too high to cause damage to the injection-molded part during demolding or to cause difficulty in demolding.

5. When the injection head injects the molten material into the locking cavities, 120-130 g of molten material is injected into the injection-molded locks of a single injection-molded floor blank. When the molten material passes through the nozzle to the straight flow channels, the molten material is injected at a pressure of 72-78 bar and a flow rate of 92-96% for a stroke of 58-65 mm. When the molten material passes through the straight flow channels to the curved flow channels, the molten material is delivered at a pressure of 28-32 bar and a flow rate of 68-72% for a stroke of 38-42 mm. When the molten material passes through the curved flow channels to the locking pin tubes, the molten material is delivered at a pressure of 15-21 bar and a flow rate of 48-52% for a stroke of 28-32 mm. When the molten material passes through the locking pin tubes to the adhesive ports of the upper molding cavity, the molten material is delivered at a pressure of 52-58 bar for 0.13-0.17 s and at a flow rate of 48-52%. The total weight of the material flowing out of all the adhesive ports is approximately the material weight. The plastic locking floor injection-molded with these parameters has high dimensional accuracy and desirable quality.

Reference Numerals: 1. supporting frame of injection molding machine; 2. standing post; 3. fixing block; 4. hydraulic rotor; 5. feed port; 6. screw; 7. heating sleeve; 8. hydraulic lifting rod; 9. nozzle; 10. fastening plate; 11. connecting port; 12. straight flow channel; 13. curved flow channel; 14. straight material channel; 15. curved material channel; 16. cooling plate; 17. locking pin tube; 18. perforated metal filter; 19. upper molding plate; 20. slider positioning block; 21. upper molding cavity; 22. upper mold closing positioning block; 23. upper circular mold positioning block; 24. lower molding plate; 25. long-side slider; 26. pneumatic pusher; 27. lower circular mold positioning block; 28. lower mold closing positioning block; 29. pallet post; 30. lower molding cavity; and 31. wide-side slider.

DETAILED DESCRIPTION OF THE EMBODIMENTS

The present invention is described in further detail below with reference to the embodiments, and the described embodiments are only a part, rather than all of the embodiments of the present invention. All other embodiments obtained by those of ordinary skill in the art based on the embodiments of the present invention without creative efforts should fall within the protection scope of the present invention.

Embodiment 1

A production method of a floor for quick side-slide installation includes the following steps:
Step 1: Sorting of floor blanks:
The floor blanks are inspected one by one in terms of moisture content, dimensions and appearance quality. The moisture content is controlled within 6-11%. The dimensions meet a production requirement. The appearance quality meets a requirement of LY/T 2058-2012 Blanks for Solid Wood Flooring.
Step 2: Curing of the floor blanks:
the floor blanks qualified after being sorted in Step 1 are stacked in a curing area for curing for 25-30 days. The floor blanks are ventilated and protected from sun and rain. The curing area has a relative humidity of 25-55% and a temperature of 20-25° C. For each stack of floor blanks, five floor blanks are arranged in three rows at an equal interval to serve as a stack base, and the other floor blanks are stacked in layers. On each layer, three floor blanks are stacked vertically and seven floor blanks are stacked horizontally. The distance between adjacent stacks of floor blanks is at least 30-50 cm. The height of each stack does not exceed 1.5 m.

Step 3: Sanding of the floor blanks:

Top surfaces of the floor blanks qualified after being cured in Step 2 are sanded to be flat and smooth, without wavy patterns or missing sanding. An 80, 100 or 120-grit sanding belt is used for sanding.

Step 4: Cutting-to-thickness of the floor blanks:

the floor blanks qualified after being sanded in Step 3 are put on a conveyor belt, and respective back surfaces of the floor blanks faces up during feeding. A back-groove-free tool is used to cut the floor blanks to a thickness in accordance with the production requirement; and after cutting-to-thickness, the back surfaces of the floor blanks are flat and smooth without indentation.

Step 5: Surface treatment of the floor blanks:

The top surfaces of the floor blanks are treated to be flat or non-flat. When the top surfaces of the floor blanks are required to be non-flat, the top surfaces of the floor blanks are hand-scraped or wire-brushed. When the top surfaces of the floor blanks are required to be flat, the top surfaces of the floor blanks need no treatment.

In Step 5, the floor blanks are specifically hand-scraped as follows. The floor blanks qualified after cutting-to-thickness in Step 4 are put on a conveyor belt, and respective back surfaces of the floor blanks faces up during feeding to enter a planer. Swing arcs of six swing knives of the planer are adjusted, where any two swing knives are adjusted to have a slightly larger swing arc to avoid excessive overlap with the rest four swing knives. The six swing knives have a depth of 0.2-0.4 mm.

In Step 5, the floor blanks are specifically wire-brushed as follows.

The floor blanks qualified after cutting-to-thickness in Step 4 are placed with respective back surfaces facing up, and are wire-brushed with a steel wire roller, which is provided with a 0.3-0.6 mm steel wire. Usually 6 sets of wire-brushing rollers are used, and the number of the wire-brushing roller sets specifically depends on the top surface effect on site.

Figure 6:
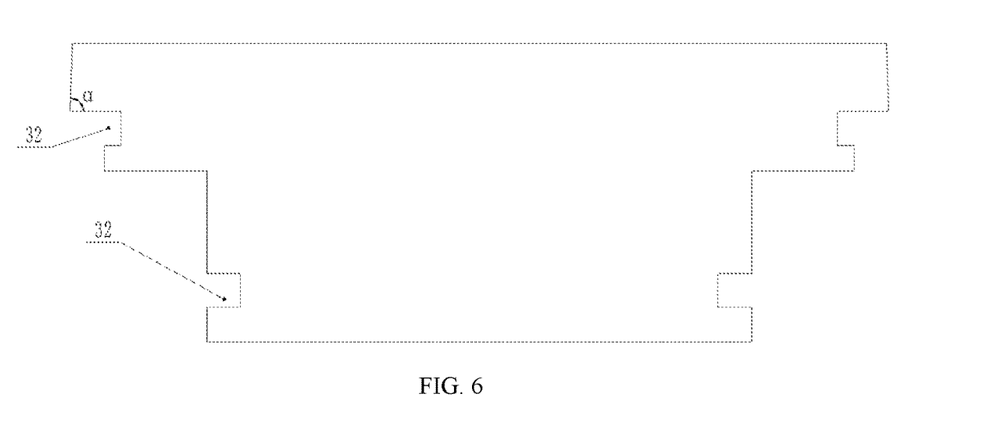
FIG. 6 is a cross-sectional view of a floor blank after cutting-to-length and molding by the production method of a floor for quick side-slide installation according to the present invention.

Step 6: Cutting-to-length and molding of the floor blanks:

As shown in FIG. 6, the floor blanks after being surface-treated in Step 5 are placed on a four-sided planer. First, a double-end milling device is used to cut the floor blanks to a length in accordance with the production requirement. A pre-cutting knife, a molding knife, a finishing knife and a locking knife of the four-sided planer are activated in sequence to mill two layers of fixing grooves at a periphery of the floor blanks, where upper fixing grooves and lower fixing grooves are retracted from the top surfaces to the back surfaces of the floor blanks. A boss with an inclined side is formed between a top surface of each of the upper fixing grooves and the top surface of a corresponding floor blank. An acute angle is defined between the inclined side and a top surface of a first groove. When the floor blank is cut to a length, an edge breakage is less than or equal to 4 mm. The shape of a cross section of the fixing groove includes, but is not limited to, a rectangle and a trapezoid.

Step 7: Spraying of anti-cracking oil on the floor blanks:

The anti-cracking oil is evenly sprayed by a spray gun onto peripheral end surfaces of the floor blanks after being milled in Step 6. During spraying, the floor blanks to be sprayed are aligned, and the anti-cracking oil is sprayed obliquely from top to bottom, and the top surfaces of the floor blanks should not be sprayed.

Step 8: Plastic encapsulation of the floor blanks:

The floor blanks after being sprayed with the anti-cracking oil in Step 7 are placed in a lower molding cavity 30 of a lower mold with respective surfaces facing down. Pneumatic pushers 26 push a long-side slider 25 and a wide-side slider 31 to move inward respectively to clamp a to-be-injected floor blank, and the lower mold and an upper mold are closed. A hydraulic rotor 4 starts to rotate and pressurize. A molten material passes through a nozzle 9 via straight flow channels 12, curved flow channels 13 and locking pin tubes 17 to adhesive ports of an upper molding cavity 21, and is injected into locking cavities at the periphery of the to-be-injected floor blank. Cooling water of 20-25° C. is pumped to cool the lower molding cavity 30 of the lower mold for 20-30 s. After the treatment lasts for a total of 40-50 s, the upper mold is moved upward to be separated from the lower mold. The long-side slider 25 and the wide-side slider 31 of the lower mold are separated under the action of the pneumatic pushers 26. The injected locking floor is lifted by the pallet posts 29, and the locking floor is separated from the molding cavity.

An injection-molded frame and injection-molded locks formed on the injection-molded frame are formed at the periphery of the floor blank, and the injection-molded frame is hidden under the boss of the floor blank.

Figure 1:
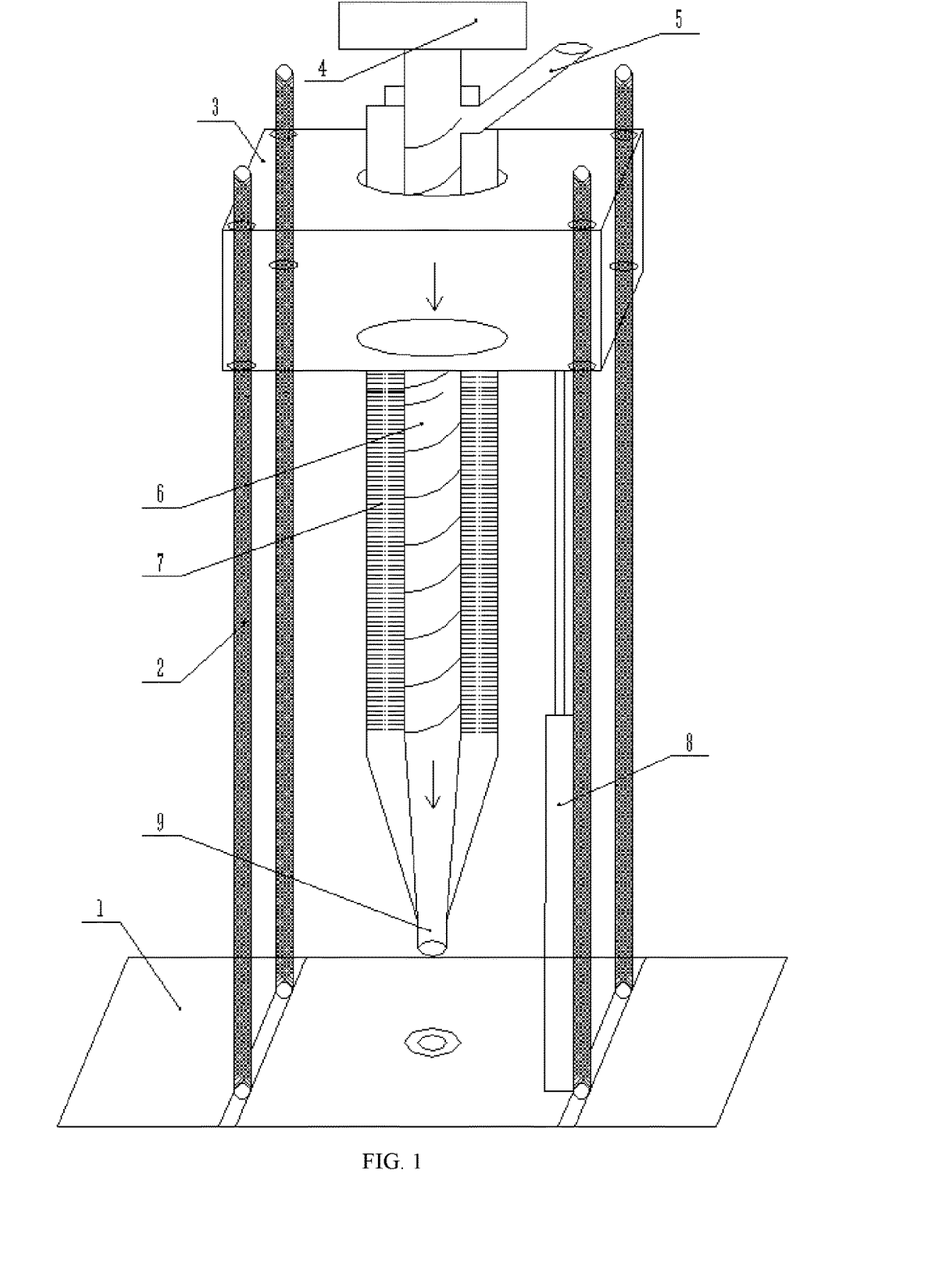
FIG. 1 is a structural view of an injection head used by a production method of a floor for quick side-slide installation according to the present invention.

As shown in FIG. 1, in Step 8, an injection head includes standing posts 2, a fixing block 3, a hydraulic lifting rod 8, a heating sleeve 7, the hydraulic rotor 4, a feed port 5, a screw 6 and the nozzle 9. The hydraulic rotor 4 is connected to a top of the screw 6, and the nozzle 9 is connected to a bottom of the screw 6. The feed port 5 is provided on the screw 6 and adjacent to the hydraulic rotor 4. The fixing block 3 is fixedly sleeved outside the heating sleeve 7. The standing posts 2 penetrate and are slidably connected to four corners of the fixing block 3. Bottoms of the standing posts 2 are slidably fixed in sliding grooves provided in a supporting frame 1 of an injection molding machine. The supporting frame is provided with a first through hole opposite to the nozzle 9. The hydraulic lifting rod 8 is provided between the supporting frame 1 of the injection molding machine and the fixing block 3.

In Step 8, when the injection head injects the molten material into the locking cavities, a flow rate of solute in the molten material is required to be greater than 22 g/10 min. After the molten material is solidified, the flow rate of the solute is tested to be greater than 16 g/10 min. The molten material is at 220-230° C.

Figure 2:
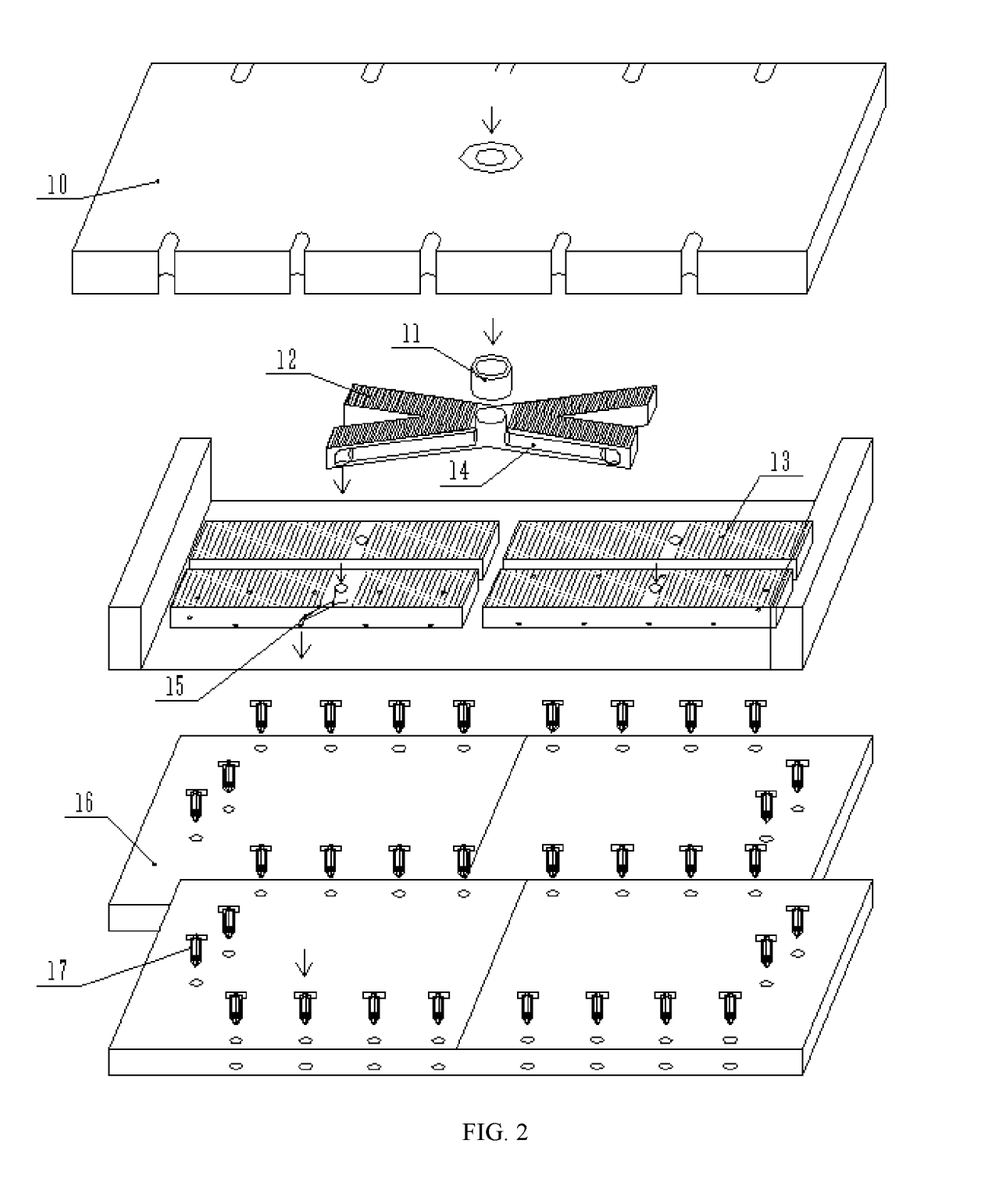
FIG. 2 is a structural view of an upper mold used by the production method of a floor for quick side-slide installation according to the present invention.
Figure 4:
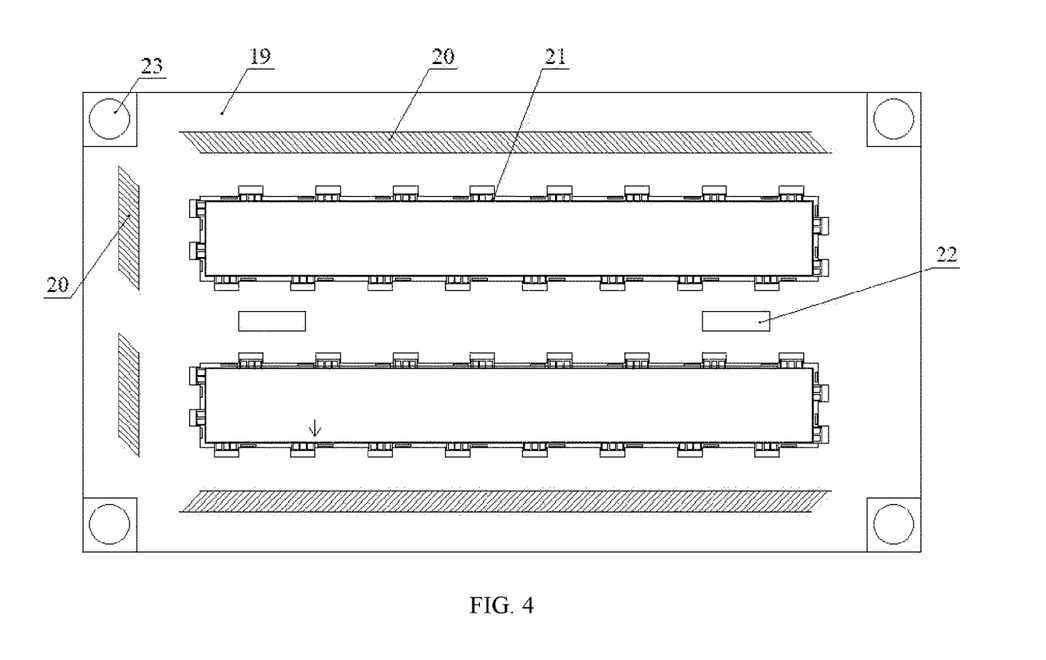
FIG. 4 is a structural view of an upper molding plate of the upper mold used by a production method of a floor for quick side-slide installation according to the present invention.

As shown in FIG. 2, in Step 8, the upper mold includes a fastening plate 10, a connecting port 11, the straight flow channels 12, the curved flow channels 13, a cooling plate 16 and an upper molding plate 19, which are arranged in sequence from top to bottom and connected to the supporting frame 1 of the injection molding machine. As shown in FIG. 4, the upper molding cavity 21 is provided on the upper molding plate 19. The fastening plate 10 is provided with a second through hole opposite to the first through hole. A third through hole is provided at a middle of the straight flow channels 12. A top of the connecting port 11 is connected to the second through hole, and a bottom of the connecting port 11 is connected to the third through hole. At least two straight material channels 14 are embedded in the straight flow channels 12, and inlets of all the straight material channels 14 communicate with the third through hole. The number of the curved flow channels 13 is equal to the number of the straight material channels 14. Fourth through holes are respectively provided at middles of the curved flow channels 13. Outlets of the straight material channels 14 respectively communicate with the fourth through holes. a plurality of curved material channels 15 are embedded in the curved flow channels 13. In this embodiment, the curved flow channels 13 are embedded with 40 curved material channels, and inlets of all the curved material channels 15 respectively communicate with the fourth through holes. The cooling plate 16 is embedded with locking pin tubes 17, where the number of the locking pin tubes 17 is identical to the number of the curved material channels 15. Outlets of the curved material channels 15 respectively communicate with inlets of the locking pin tubes 17 in one-to-one correspondence. The upper molding cavity 21 is internally provided with lock-shaped adhesive ports, and the outlets of the locking pin tubes 17 respectively communicate with the adhesive ports of the upper molding cavity 21.

Specifically, electric heating tubes for heat preservation of the molten material are respectively provided outside the straight flow channels 12 and the curved flow channels 13. Four straight flow channels 12 are arranged and distributed in an X shape.

Figure 5:
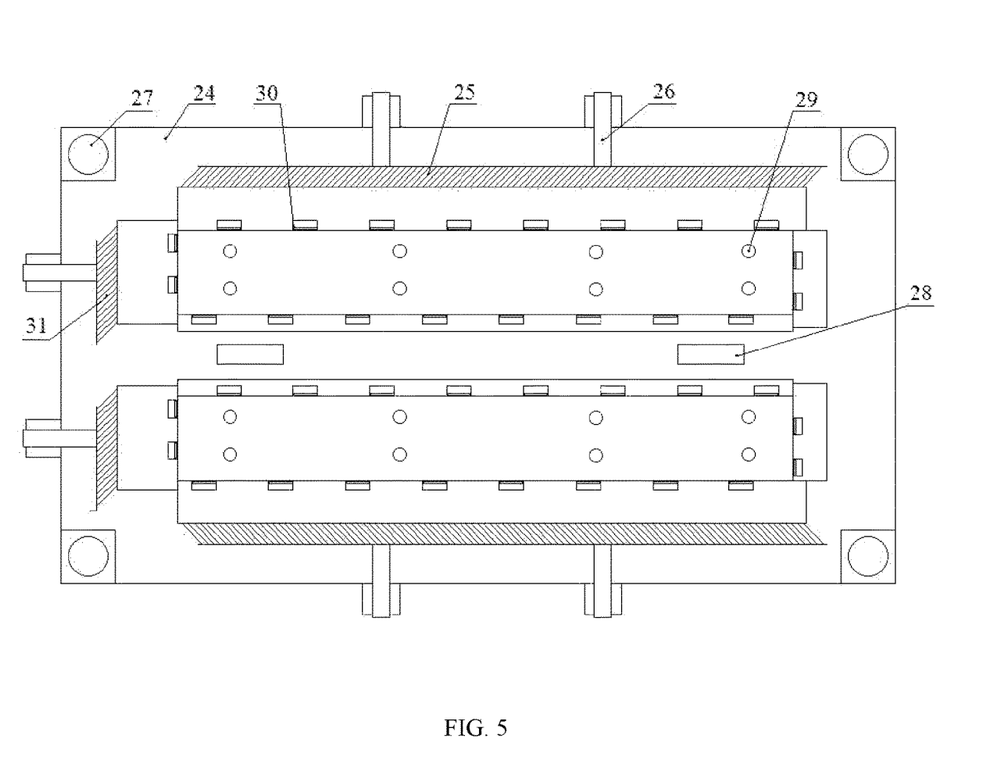
FIG. 5 is a structural view of a lower molding plate of a lower mold used by the production method of a floor for quick side-slide installation according to the present invention.

In Step 8, the lower mold includes a pallet supporting frame, a lower molding plate 24 provided on the pallet supporting frame, the lower molding cavity 30 provided on the lower molding plate 24 and matched with the upper molding cavity 21, the long-side slider 25 provided on the lower molding plate 24 and corresponding to a long side of the lower molding cavity 30, the wide-side slider 31 provided on the lower molding plate 24 and corresponding to a wide side of the lower molding cavity 30, and the pallet posts 29. The bottoms of the pallet posts 29 are fixedly connected to the pallet supporting frame. The lower molding plate 24 in the lower molding cavity 30 is provided with ejection holes matched with the pallet posts 29. The tops of the pallet posts 29 are provided in the ejection holes, and the tops of the pallet posts 29 are movable upward along the ejection holes to stick out of the ejection holes. The pneumatic pushers 26 are respectively connected to the long-side slider 25 and the wide-side slider 31. In this embodiment, there are 8 pallet posts 29, which lift the injection-molded floor in the molding cavity up and out of the molding cavity when the long-side slider and wide-side slider 31 of the lower mold are separated from the molding cavity.

In Step 8, the mold is heated before the injection molding of the injection-molded locks of the floor blank. The cooling water in the upper molding plate 19 is connected, and the electric heating tubes outside the straight flow channels 12 and the curved flow channels 13 are turned on. The temperature of the electric heating tubes and the temperature of the nozzle 9 of the injection head are set to 220-230° C. When the temperature of the electric heating tubes outside the straight flow channels 12 and the curved flow channels 13 rises to 160° C., electric heating tubes outside the locking pin tubes 17 are turned on and set to 220-230° C.

In Step 8, when the injection head injects the molten material into the locking cavities, 120-130 g of molten material is injected into the injection-molded locks of a single injection-molded floor blank. When the molten material passes through the nozzle 9 to the straight flow channels 12, the molten material is delivered at a pressure of 72 bar and a flow rate of 92% for a stroke of 58 mm. When the molten material passes through the straight flow channels 12 to the curved flow channels 13, the molten material is delivered at a pressure of 28 bar and a flow rate of 68% for a stroke of 38 mm. When the molten material passes through the curved flow channels 13 to the locking pin tubes 17, the molten material is delivered at a pressure of 15 bar and a flow rate of 48% for a stroke of 28 mm. When the molten material passes through the locking pin tubes 17 to the adhesive ports of the upper molding cavity 21, the molten material is delivered at a pressure of 52 bar for 0.13 s and at a flow rate of 48%. The injection parameters are adjusted according to a gap between the molding cavity and the wood, and the total weight of the material flowing out of all the adhesive ports is approximately the material weight.

Step 9: Application of a paint to the back surfaces of the floor blanks:

The back surface of the floor blank after being subjected to plastic-encapsulation in Step 8 is sanded by a sander, and then a paint is applied on the back. In Step 9, the paint is applied to the back surfaces of the floor blanks as follows. The back surface of the floor blank is sanded, the dust left on the back surfaces of the floor blanks due to sanding is absorbed, and a layer of transparent putty is coated evenly. The floor blank is subjected to ultraviolet (UV) semi-curing, sanded with sandpaper, and coated with a high-hardness primer and an ordinary primer in sequence. Then the floor blank is subjected to UV semi-curing, sanded with 240-grit sandpaper, and coated with a colored putty and a transparent primer. The amount of the paint applied is above 100 g/m$^2$.

Step 10: Application of the paint or vegetable oil to the floor blanks:

The floor blanks after being applied with the paint on the back surfaces in step 9 are sanded by the sander, and then are applied with the paint or the vegetable oil.

Embodiment 2

As shown in FIG. 2, this embodiment is a further optimization of Embodiment 1. The same parts between the two embodiments will not be repeated, and the improvement of this embodiment based on Embodiment 1 is as follows. In this embodiment, in Step 8, when the injection head injects the molten material into the locking cavities, 130 g of molten material is injected into the injection-molded locks of a single injection-molded floor blank. When the molten material passes through the nozzle 9 to the straight flow channels 12, the molten material is delivered at a pressure of 78 bar and a flow rate of 96% for a stroke of 65 mm. When the molten material passes through the straight flow channels 12 to the curved flow channels 13, the molten material is delivered at a pressure of 32 bar and a flow rate of 72% for a stroke of 42 mm. When the molten material passes through the curved flow channels 13 to the locking pin tubes 17, the molten material is delivered at a pressure of 21 bar and a flow rate of 52% for a stroke of 32 mm. When the molten material passes through the locking pin tubes 17 to the adhesive ports of the upper molding cavity 21, the molten material is delivered at a pressure of 58 bar for 0.17 s and at a flow rate of 52%.

Embodiment 3

As shown in FIG. 2, this embodiment is a further optimization of Embodiment 2. The same parts between the two embodiments will not be repeated, and the improvement of this embodiment based on Embodiment 2 is as follows. In this embodiment, in Step 8, when the injection head injects the molten material into the locking cavities, 120-130 g of molten material is injected into the injection-molded locks of a single injection-molded floor blank. When the molten material passes through the nozzle 9 to the straight flow channels 12, the molten material is delivered at a pressure of 75 bar and a flow rate of 95% for a stroke of 60 mm. When the molten material passes through the straight flow channels 12 to the curved flow channels 13, the molten material is delivered at a pressure of 30 bar and a flow rate of 70% for a stroke of 40 mm. When the molten material passes through the curved flow channels 13 to the locking pin tubes 17, the molten material is delivered at a pressure of 18 bar and a flow rate of 50% for a stroke of 30 mm. When the molten material passes through the locking pin tubes 17 to the adhesive ports of the upper molding cavity 21, the molten material is delivered at a pressure of 55 bar for 0.15 s and at a flow rate of 50%.

Embodiment 4

Figure 3:
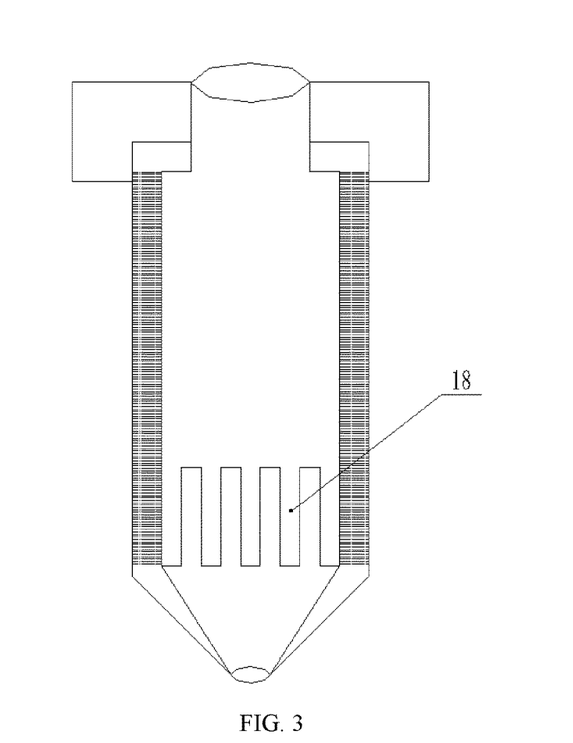
FIG. 3 is a structural view of a locking pin tube embedded in the upper mold used by a production method of a floor for quick side-slide installation according to the present invention.

As shown in FIG. 2, this embodiment is a further optimization of Embodiment 3. The same parts between the two embodiments will not be repeated, and the improvement of this embodiment based on Embodiment 3 is as follows. In this embodiment, Each of the locking pin tubes 17 is provided with a T-shaped cross section. The locking pin tubes 17 are hollow inside, and each of the locking pin tubes 17 is internally provided with a perforated metal filter 18. A diameter of the perforated metal filter 18 and a diameter of each of the outlets of the locking pin tubes 17 are equal to be 1 mm. Each of the locking pin tubes 17 is externally provided with an electric heating tube for heat preservation of the molten material. As shown in FIG. 3, the locking pin tubes 17 have a T-shaped design, and are externally provided with a spiral electric heating sleeve 7 for heat preservation of the molten material. The locking pin tubes are hollow inside and each are provided therein with a perforated metal filter 18. The perforated metal filter 18 has a diameter of 1 mm, which is matched with the 1 mm outlet of the corresponding locking pin tube 17 to prevent a pin gate from being blocked by foreign matter in the molten material. The outlet of the locking pin tube 17 is connected to a corresponding adhesive port of the upper molding cavity 21. Under normal pressure, the molten material in the 1 mm pin gate will not flow out in a large amount, which plays a role of throttling. The locking pin tubes 17 are embedded in a channel of the cooling plate 16, and cooling water is passed into the cooling plate 16 to keep the temperature of the upper molding cavity 21 not higher than 40° C., and prevent any material change or size deviation of the molding cavity due to high temperature.

Embodiment 5

As shown in FIG. 4, this embodiment is a further optimization of Embodiment 4. The same parts between the two embodiments will not be repeated, and the improvement of this embodiment based on Embodiment 4 is as follows. In this embodiment, four corners of the upper molding plate 19 of the upper mold are provided with upper circular mold positioning blocks 23. Upper mold closing positioning blocks 22 are provided at a center of the upper molding plate 19 in the upper molding cavity 21. The upper molding plate 19 is provided with slider positioning blocks 20 opposite to a long side and a wide side of the upper molding cavity 21 respectively. Four corners of the lower molding plate 24 of the lower mold are provided with lower circular mold positioning blocks 27 that are respectively matched with the upper circular mold positioning blocks 23. Lower mold closing positioning blocks 28 matched with the upper mold closing positioning blocks 22 are provided at a center of the lower molding plate 24. The slider positioning blocks 20 are used to ensure the precise positioning of the long-side slider 25 and the wide-side slider 31 of the lower mold when the upper and lower molds are closed, so as to ensure the position accuracy of the molten material flowing and molding at the periphery of the floor blank.

Embodiment 6

As shown in FIG. 5, this embodiment is a further optimization of Embodiment 5. The same parts between the two embodiments will not be repeated, and the improvement of this embodiment based on Embodiment 5 is as follows. In this embodiment, there are two lower molds, namely a lower left mold and a lower right mold. A floor blank is placed in the lower molding cavity 30 of the lower left mold. The to-be-injected floor blank is clamped through the pneumatic pushers 26, and the supporting frame 1 of the injection molding machine slides up to the upper mold along the sliding grooves, such that the lower left mold is closed with the upper mold to complete injection. After the lower left mold is separated from the upper mold, the lower right mold is subjected to the same operation to be closed with the upper mold to complete injection. When the floor blank is picked and placed into one mold, the floor blank in the other mold is injection-molded, which improves production efficiency.

Embodiment 7

This embodiment is a further optimization of Embodiment 6. The same parts between the two embodiments will not be repeated, and the improvement of this embodiment based on Embodiment 6 is as follows. In this embodiment, the floor blanks include, but are not limited to, pure solid wood floors, glued floors, fiber floors, shavings floors, artificial floors, parallel-to-grain wood laminate floors, joinery floors, finger-jointed floors, integrated floors, wood-plastic composite floors, magnesium oxide floors and bamboo parquet floor.

Embodiment 8

This embodiment is a further optimization of Embodiment 7. The same parts between the two embodiments will not be repeated, and the improvement of this embodiment based on Embodiment 7 is as follows. In this embodiment, the molten material is composed of polyethylene, polypropylene, polyvinyl chloride, polystyrene, polyoxymethylene, polychromium carbonate, an acrylic plastic, polyolefin, a polyolefin copolymer, polysulfone, polyphenylene ether, a thermoplastic composed of chlorinated polyether, a hot melt adhesive, or a thermoplastic elastomer.

The above described are merely preferred embodiments of the present invention, and not intended to limit the present invention. Any modifications, equivalent replacements and improvements made within the spirit and principle of the present invention should all fall within the scope of protection of the present invention.

What is claimed is:

1. A production method of a floor for quick side-slide installation, comprising the following steps:

step 1: sorting of floor blanks:
the floor blanks are inspected one by one in terms of moisture content, dimensions and appearance quality; the moisture content is controlled within 6-11%; the dimensions are predetermined; and the appearance quality meets a requirement of LY/T 2058-2012 Blanks for Solid Wood Flooring;

step 2: curing of the floor blanks:
the floor blanks after being sorted in step 1 are stacked in a curing area for a curing, wherein a duration of the curing is 25-30 days; the floor blanks are ventilated and protected from sun and rain, and the curing area has a relative humidity of 25-55% and a temperature of 20-25° C.;

step 3: sanding of the floor blanks:
top surfaces of the floor blanks after being cured in step 2 are sanded to be flat and smooth;

step 4: cutting-to-thickness of the floor blanks:
the floor blanks after being sanded in step 3 are put on a conveyor belt, and respective back surfaces of the floor blanks face up when the floor blanks are fed by the conveyor belt to enter a planer; a back-groove-free tool is used to cut the floor blanks to a predetermined thickness; and after cutting-to-thickness, the back surfaces of the floor blanks are flat and smooth without indentation;

step 5: surface treatment of the floor blanks:
the top surfaces of the floor blanks are treated to be flat or non-flat; wherein
when the top surfaces of the floor blanks are required to be non-flat, the top surfaces of the floor blanks are hand-scraped or wire-brushed; and
when the top surfaces of the floor blanks are required to be flat, the top surfaces of the floor blanks need no treatment;

step 6: cutting-to-length and molding of the floor blanks:
the floor blanks after being surface-treated in step 5 are placed on a four-sided planer; first, a double-end milling device is used to cut the floor blanks to a predetermined length; a pre-cutting knife, a molding knife, a finishing knife and a locking knife of the four-sided planer are activated in sequence to mill two layers of fixing grooves at a periphery of the floor blanks, wherein upper fixing grooves and lower fixing grooves are retracted from the top surfaces to the back surfaces of the floor blanks; a boss with an inclined side is formed between a top surface of each of the upper fixing grooves and a top surface of each of the floor blanks; and an acute angle is defined between the inclined side and a top surface of a first groove;

step 7: spraying of anti-cracking oil on the floor blanks:
the anti-cracking oil is evenly sprayed by a spray gun onto peripheral end surfaces of the floor blanks after being milled in step 6;

step 8: plastic encapsulation of the floor blanks:
the floor blanks after being sprayed with the anti-cracking oil in step 7 are placed in a lower molding cavity of a lower mold, wherein the top surfaces of the floor blanks face down; an upper mold is closed downward with the lower mold; then an injection head injects a molten material into locking cavities formed by the periphery of the floor blanks and an upper molding cavity of the upper mold and the lower molding cavity of the lower mold; after injection, water is immediately pumped to cool the lower molding cavity of the lower mold; an injection-molded frame and injection-molded locks formed on the injection-molded frame are formed at the periphery of the floor blanks; and the injection-molded frame is hidden under bosses of the floor blanks;

step 9: application of a paint to the back surfaces of the floor blanks:
the back surfaces of the floor blanks after being subjected to plastic-encapsulation in step 8 are sanded by a sander, and are applied with the paint; and step 10: application of the paint or vegetable oil to the floor blanks:
the floor blanks after being applied with the paint on the back surfaces in step 9 are sanded by the sander, and then are applied with the paint or the vegetable oil.

2. The production method according to claim 1, wherein in step 2, for each stack of floor blanks, five floor blanks are arranged in three rows at an equal interval to serve as a stack base, and the other floor blanks are stacked in layers; on each layer, three floor blanks are stacked vertically and seven floor blanks are stacked horizontally; and a distance between adjacent stacks of floor blanks is at least 30-50 cm.

3. The production method according to claim 2, wherein in step 8, the injection head comprises standing posts, a fixing block, a hydraulic lifting rod, a heating sleeve, a hydraulic rotor, a feed port, a screw and a nozzle; the hydraulic rotor is connected to a top of the screw, and the nozzle is connected to a bottom of the screw; the feed port is provided on the screw and adjacent to the hydraulic rotor; the fixing block is fixedly sleeved outside the heating sleeve: the standing posts penetrate and are slidably connected to four corners of the fixing block; bottoms of the standing posts are slidably fixed in sliding grooves provided in a supporting frame of an injection molding machine; the supporting frame is provided with a first through hole opposite to the nozzle; and the hydraulic lifting rod is provided between the supporting frame of the injection molding machine and the fixing block.

4. The production method according to claim 1, wherein in step 3, an 80, 100 or 120-grit sanding belt is used for sanding.

5. The production method according to claim 1, wherein in step 6, when the floor blanks are cut to a length, an edge breakage is less than or equal to 4 mm.

6. The production method according to claim 1, wherein in step 8, the injection head comprises standing posts, a fixing block, a hydraulic lifting rod, a heating sleeve, a hydraulic rotor, a feed port, a screw and a nozzle; the hydraulic rotor is connected to a top of the screw, and the nozzle is connected to a bottom of the screw; the feed port is provided on the screw and adjacent to the hydraulic rotor; the fixing block is fixedly sleeved outside the heating sleeve; the standing posts penetrate and are slidably connected to four corners of the fixing block; bottoms of the standing posts are slidably fixed in sliding grooves provided in a supporting frame of an injection molding machine; the supporting frame is provided with a first through hole opposite to the nozzle; and the hydraulic lifting rod is provided between the supporting frame of the injection molding machine and the fixing block.

7. The production method according to claim 1, wherein in step 8, the upper mold comprises a fastening plate, a connecting port, straight flow channels, curved flow channels, a cooling plate and an upper molding plate, wherein the fastening plate, the connecting port, the straight flow channels, the curved flow channels, the cooling plate and the upper molding plate are arranged in sequence from top to bottom and connected to the supporting frame of the injection molding machine; the upper molding cavity is provided on the upper molding plate; the fastening plate is provided with a second through hole opposite to the first through hole; a third through hole is provided at a middle of the straight flow channels; a top of the connecting port is connected to the second through hole, and a bottom of the connecting port is connected to the third through hole; at least two straight material channels are embedded in the straight flow channels, and inlets of the at least two straight material channels communicate with the third through hole; a number of the curved flow channels is equal to a number of the at least two straight material channels; fourth through holes are respectively provided at middles of the curved flow channels; outlets of the at least two straight material channels respectively communicate with the fourth through holes; a plurality of curved material channels are embedded in the curved flow channels, and inlets of the plurality of curved material channels respectively communicate with the fourth through holes; the cooling plate is embedded with locking pin tubes, wherein a number of the locking pin tubes is identical to a number of the plurality of curved material channels; outlets of the plurality of curved material channels respectively communicate with inlets of the locking pin tubes in one-to-one correspondence; the upper molding cavity is internally provided with lock-shaped adhesive ports; and outlets of the locking pin tubes respectively communicate with the lock-shaped adhesive ports of the upper molding cavity.

8. The production method according to claim 7, wherein electric heating tubes for heat preservation of the molten material are respectively provided outside the straight flow channels and the curved flow channels; and four straight flow channels are arranged and distributed in an X shape.

9. The production method according to claim 8, wherein each of the locking pin tubes is provided with a T-shaped cross section; the locking pin tubes are hollow inside, and each of the locking pin tubes is internally provided with a perforated metal filter; a diameter of the perforated metal filter and a diameter of each of the outlets of the locking pin tubes are equal to be 1 mm; and each of the locking pin tubes is externally provided with an electric heating tube for heat preservation of the molten material.

10. The production method according to claim 9, wherein four corners of the upper molding plate of the upper mold are provided with upper circular mold positioning blocks; upper mold closing positioning blocks are provided at a center of the upper molding plate in the upper molding cavity; and the upper molding plate is provided with slider positioning blocks opposite to a long side and a wide side of the upper molding cavity respectively.

11. The production method according to claim 10, wherein in step 8, the lower mold comprises:
a pallet supporting frame,
a lower molding plate provided on the pallet supporting frame,
the lower molding cavity provided on the lower molding plate and matched with the upper molding cavity,
a long-side slider provided on the lower molding plate and corresponding to a long side of the lower molding cavity,
a wide-side slider provided on the lower molding plate and corresponding to a wide side of the lower molding cavity, and
pallet posts;
wherein bottoms of the pallet posts are fixedly connected to the pallet supporting frame; the lower molding plate in the lower molding cavity is provided with ejection holes matched with the pallet posts; tops of the pallet posts are provided in the ejection holes, and the tops of the pallet posts are movable upward along the ejection holes to stick out of the ejection holes; and pneumatic pushers are respectively connected to the long-side slider and the wide-side slider.

12. The production method according to claim 11, wherein four corners of the lower molding plate of the lower mold are provided with lower circular mold positioning blocks, wherein the lower circular mold positioning blocks are respectively matched with the upper circular mold positioning blocks; and lower mold closing positioning blocks matched with the upper mold closing positioning blocks are provided at a center of the lower molding plate.

13. The production method according to claim 12, wherein when the floor blanks are subjected to plastic-encapsulation, the floor blanks are placed in the lower molding cavity of the lower molding cavity, wherein the top surfaces of the floor blanks face down; the pneumatic pushers push the long-side slider and the wide-side slider to move inward respectively to clamp a to-be-injected floor blank, and then the lower mold and the upper mold are closed; the hydraulic rotor starts to rotate and pressurize; the molten material passes through the nozzle via the straight flow channels, the curved flow channels and the locking pin tubes to the lock-shaped adhesive ports of the upper molding cavity, and then the molten material is injected into locking cavities at a periphery of the to-be-injected floor blank; cooling water of 20-25° C. is pumped to cool the lower molding cavity of the lower mold for 20-30 s; after a treatment lasts for a total of 40-50 s, the upper mold is moved upward to be separated from the lower mold; the long-side slider and the wide-side slider of the lower mold are separated under an action of the pneumatic pushers; and an injected locking floor is lifted by the pallet posts, and the injected locking floor is separated from the lower molding cavity.

14. The production method according to claim 12, wherein a lower left mold and a lower right mold are arranged; a floor blank is placed in the lower molding cavity of the lower left mold; a to-be-injected floor blank is clamped through the pneumatic pushers, and the supporting frame of the injection molding machine slides up to the upper mold along the sliding grooves, wherein the lower left mold is closed with the upper mold to complete injection; and after the lower left mold is separated from the upper mold, the lower right mold is subjected to the same operation to be closed with the upper mold to complete injection.

15. The production method according to claim 7, wherein in step 8, the mold is heated before the injection molding of the injection-molded locks of the floor blank; the cooling water in the upper molding plate is connected, and the electric heating tubes outside the straight flow channels and the curved flow channels are turned on; a temperature of the electric heating tubes and a temperature of the nozzle of the injection head are set to 220-230° C.; and when the temperature of the electric heating tubes outside the straight flow channels and the curved flow channels rises to 160° C., electric heating tubes outside the locking pin tubes are turned on and set to 220-230° C.

16. The production method according to claim 15, wherein in step 8, when the injection head injects the molten material into the locking cavities, 120-130 g of molten material is injected into the injection-molded locks of a single injection-molded floor blank; when the molten material passes through the nozzle to the straight flow channels, the molten material is injected at a pressure of 72-78 bar and a flow rate of 92-96% for a stroke of 58-65 mm; when the molten material passes through the straight flow channels to the curved flow channels, the molten material is delivered at a pressure of 28-32 bar and a flow rate of 68-72% for a stroke of 38-42 mm; when the molten material passes through the curved flow channels to the locking pin tubes, the molten material is delivered at a pressure of 15-21 bar and a flow rate of 48-52% for a stroke of 28-32 mm; and when the molten material passes through the locking pin tubes to the lock-shaped adhesive ports of the upper molding cavity, the molten material is delivered at a pressure of 52-58 bar for 0.13-0.17 s and at a flow rate of 48-52%.

17. The production method according to claim 6, wherein in step 8, when the injection head injects the molten material into the locking cavities, a flow rate of solute in the molten material is required to be greater than 22 g/10 min; after the molten material is solidified, the flow rate of the solute is tested to be greater than 16 g/10 min; and the molten material is at 220-230° C.

18. The production method according to claim 1, wherein in step 9, the paint is applied to the back surfaces of the floor blanks as follows: the back surfaces of the floor blanks are sanded, dust left on the back surfaces of the floor blanks due to sanding is absorbed, and a layer of transparent putty is coated evenly; the floor blanks are subjected to ultraviolet (UV) semi-curing, sanded with sandpaper, and coated with a high-hardness primer and an ordinary primer in sequence; and the floor blanks are subjected to UV semi-curing, sanded with 240-grit sandpaper, and coated with a colored putty and a transparent primer, wherein an amount of the paint applied is above 100 g/m$^2$.

19. The production method according to claim 1, wherein the floor blanks comprise pure solid wood floors, glued floors, fiber floors, shavings floors, artificial floors, parallel-to-grain wood laminate floors, joinery floors, finger-jointed floors, integrated floors, wood-plastic composite floors, magnesium oxide floors and bamboo parquet floor.

20. The production method according to claim 1, wherein the molten material is composed of polyethylene, polypropylene, polyvinyl chloride, polystyrene, polyoxymethylene, polychromium carbonate, an acrylic plastic, polyolefin, a polyolefin copolymer, polysulfone, polyphenylene ether, a thermoplastic composed of chlorinated polyether, a hot melt adhesive, or a thermoplastic elastomer.

\* \* \* \* \*